United States Patent
Carlson et al.

(10) Patent No.: US 11,355,817 B2
(45) Date of Patent: Jun. 7, 2022

(54) NANOPOROUS SEPARATORS FOR BATTERIES AND RELATED MANUFACTURING METHODS

(71) Applicant: LG ENERGY SOLUTION, LTD., Seoul (KR)

(72) Inventors: Steven A. Carlson, Cambridge, MA (US); Benjamin Sloan, Exeter, NH (US); David W. Avison, Boxborough, MA (US)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/338,214

(22) Filed: Jun. 3, 2021

(65) Prior Publication Data

US 2021/0296733 A1  Sep. 23, 2021

Related U.S. Application Data (63) Continuation of application No. 16/404,015, filed on May 6, 2019, now Pat. No. 11,050,119, which is a
(Continued)

(51) Int. Cl.
*H01M 50/446* (2021.01)
*H01M 10/0525* (2010.01)
(Continued)

(52) U.S. Cl.
CPC .......... *H01M 50/446* (2021.01); *H01G 11/20* (2013.01); *H01G 11/50* (2013.01);
(Continued)

(58) Field of Classification Search
None
See application file for complete search history.

(56) References Cited

U.S. PATENT DOCUMENTS

| | | |
|---|---|---|
| 6,946,218 B2 | 9/2005 | Crouch, Jr. et al. |
| 7,066,971 B1 | 6/2006 | Carlson |

(Continued)

FOREIGN PATENT DOCUMENTS

| | | |
|---|---|---|
| CN | 103282408 A | 9/2013 |
| CN | 103283060 A | 9/2013 |

(Continued)

OTHER PUBLICATIONS

The State Intellectual Property Office of People's Republic of China, "First Office Action," issued in Chinese Patent Application No. 201680052061.X, which is a counterpart of U.S. Appl. No. 16/404,015, dated May 22, 2020, 21 pages (10 pages of English Translation of Office Action and 11 pages of Original Chinese Office Action).

(Continued)

*Primary Examiner* — Christopher P Domone
(74) *Attorney, Agent, or Firm* — Amster, Rothstein & Ebenstein LLP (57) ABSTRACT

Provided is a lithium battery, wherein the battery comprises an anode, a cathode, wherein the cathode comprises one or more transition metals, an electrolyte, and a porous separator interposed between the cathode and anode, wherein the separator comprises an anionic compound. Also provided are methods of manufacturing such batteries.

20 Claims, 6 Drawing Sheets

Related U.S. Application Data continuation of application No. 15/207,370, filed on Jul. 11, 2016, now Pat. No. 10,381,623, which is a continuation-in-part of application No. 15/130,660, filed on Apr. 15, 2016.

(60) Provisional application No. 62/231,539, filed on Jul. 9, 2015.

(51) Int. Cl.
| | | |
|---|---|---|
| *H01M 10/0585* | (2010.01) | |
| *H01G 11/50* | (2013.01) | |
| *H01G 11/52* | (2013.01) | |
| *H01M 10/052* | (2010.01) | |
| *H01G 11/20* | (2013.01) | |
| *H01M 50/46* | (2021.01) | |
| *H01M 4/505* | (2010.01) | |
| *H01M 4/525* | (2010.01) | |

(52) U.S. Cl.
CPC .......... *H01G 11/52* (2013.01); *H01M 10/052* (2013.01); *H01M 10/0525* (2013.01); *H01M 10/0585* (2013.01); *H01M 50/46* (2021.01); *H01M 4/505* (2013.01); *H01M 4/525* (2013.01); *Y02E 60/13* (2013.01)

(56) References Cited

U.S. PATENT DOCUMENTS

| 10,381,623 B2 | 8/2019 | Carlson et al. | |
|---|---|---|---|
| 2013/0171500 A1* | 7/2013 | Xu | H01G 11/52 429/145 |
| 2014/0315084 A1 | 10/2014 | Liu et al. | |
| 2015/0056426 A1 | 2/2015 | Grouchko et al. | |
| 2015/0162586 A1* | 6/2015 | Fleischmann | H01M 10/052 427/358 |
| 2015/0249249 A1* | 9/2015 | Ortega | H01M 4/34 429/219 |
| 2015/0340676 A1 | 11/2015 | Schmidhauser et al. | |
| 2016/0013461 A1 | 1/2016 | Mizuno et al. | |
| 2016/0141621 A1* | 5/2016 | Negishi | H01M 4/364 252/500 |
| 2017/0324073 A1* | 11/2017 | Herle | H01M 50/411 |

FOREIGN PATENT DOCUMENTS

| WO | 2012/011944 A2 | 1/2012 |
|---|---|---|
| WO | 2012/11157 A1 | 8/2012 |
| WO | 2014052533 A2 | 4/2014 |

OTHER PUBLICATIONS

China National Intellectual Property Administration, "The First Office Action," dated Mar. 25, 2020 in Chinese Patent Application No. 201680032801.3, which is a counterpart of U.S. Appl. No. 16/404,015, 20 pages (10 pages of English Translation of Office Action and 10 pages of Original Office Action).

Notice of Allowance dated Dec. 4, 2020 issued in counterpart Chinese Patent Application No. 201680032801.3.

* cited by examiner

NANOPOROUS SEPARATORS FOR BATTERIES AND RELATED MANUFACTURING METHODS

CROSS REFERENCE TO RELATED APPLICATIONS

This application is a continuation of U.S. patent application Ser. No. 16/404,015, filed May 6, 2019, which is a continuation of U.S. patent application Ser. No. 15/207,370, filed Jul. 11, 2016, now U.S. Pat. No. 10,381,623, which is a continuation-in-part of U.S. patent application Ser. No. 15/130,660, filed Apr. 15, 2016, which claims the benefit of and priority to U.S. Provisional Patent Application No. 62/231,539, filed Jul. 9, 2015. The contents of each of the above-referenced applications are incorporated herein by reference in their entireties.

STATEMENT OF GOVERNMENT RIGHTS

This invention was made with government support under Grant Number DE-EE00054333 awarded by the U.S. Department of Energy. The government has certain rights in the invention.

FIELD OF THE INVENTION

The present invention generally relates to the field of batteries and other electric current producing cells, such as capacitors and lithium-ion capacitors. More particularly, the present invention pertains to separators for lithium batteries and related manufacturing methods.

BACKGROUND OF THE INVENTION

Throughout this application, various patents are referred to by an identifying citation. The disclosures of the patents referenced in this application are hereby incorporated by reference into the present disclosure to more fully describe the state of the art to which this invention pertains.

Lithium batteries are widely used in portable electronics, such as smartphones and portable computers. Among the new applications for lithium batteries are high power batteries for hybrid, plug-in hybrid, and electric vehicles. However, broad acceptance of electric vehicles requires batteries that can be constructed at lower cost and that include improved safety features.

Existing processes for manufacturing lithium batteries, including rechargeable and non-rechargeable lithium batteries, and other types of batteries, are relatively slow, complex and expensive. For example, rechargeable lithium-ion batteries are typically constructed by interleaving strips of the various layers of the battery to form a stack. These layers may include a plastic separator, a conductive metal substrate with a cathode layer coated on both sides, another plastic separator, and another conductive metal substrate with an anode layer coated on both sides. This interleaving is usually done on manufacturing equipment that is inefficient and costly to construct and operate. Thus, there is a need for manufacturing techniques that do not require interleaving discrete battery layers.

As noted above, current lithium batteries are fabricated using metal substrates. During manufacture, these metal substrates are typically slit into discrete battery stacks. This has been known to result in metal fragments being embedded into the separator or other portion of the finished battery, which can lead to a short circuit, or other dangerous condition. Thus, there is a need for improved manufacturing techniques that eliminate these safety concerns.

In addition, one of the known challenges in reducing the cost of lithium-ion batteries is the composition of the cathode. In this regard, the cathode material often comprises thirty percent, or more, of the total battery cost. Thus, there has been increased interest in utilizing manganese and its oxides as a cathode material because manganese is considerably less expensive than other cathode materials and is found in abundance in nature. However, when used as a cathode in lithium-ion batteries, manganese is easily dissolved, particularly at higher temperatures. During operation, the dissolved manganese ions are deposited on the separator and anode resulting in reduced battery cycle life. Moreover, this migration problem is not limited to manganese. In this regard, there has also been a shift in the battery industry to cathodes comprising nickel-manganese-cobalt oxide (NMC) and, in particular, nickel-rich NMC. However, nickel and cobalt ions, like manganese ions, diffuse through the separator and onto the anode, reducing battery cycle life. Thus, it would be advantageous if the migration of these metals (e.g. manganese, nickel and cobalt) could be controlled and eliminated.

SUMMARY OF THE INVENTION

It is an object of the present invention to provide a battery stack or battery that could be fabricated on less complex, less expensive and higher speed automated processing equipment than, for example, the equipment utilized for portable computer batteries. Another object is provide a battery that is less expensive to make than existing batteries, and which could utilize transition metals, such as manganese, nickel and cobalt, but control the migration of these metals, without reducing battery cycle life.

The present invention meets the foregoing objects through the battery stacks and batteries described herein. The battery stacks and batteries described herein include various coatings and materials, which are described below. Examples of batteries to which the present invention apply include a single electric current producing cell and multiple electric current producing cells combined in a casing or pack. One such type of battery is a lithium battery, including, for example, rechargeable or secondary lithium ion batteries, non-rechargeable or primary lithium metal batteries, rechargeable lithium metal batteries and other battery types such as rechargeable lithium metal alloy batteries.

The battery stacks described herein include a separator, electrode and current collector. A battery stack comprising a positive electrode in combination with a battery stack comprising a negative electrode, together, form a battery. The battery stacks and batteries described herein include a separator to keep the two electrodes apart in order to prevent electrical short circuits while also allowing the transport of lithium ions and any other ions during the passage of current in an electrochemical cell. Examples of separators that may be utilized in lithium batteries include ceramic separators and polyolefin separators. Ceramic separators include separators comprising inorganic oxides and other inorganic materials.

The battery stacks and batteries described herein include an electrode that comprises electroactive material. The electrode layer may be configured to function as the anode (negative electrode) or cathode (positive electrode). In a lithium ion battery, for example, electric current is generated when lithium ions diffuse from the anode to the cathode through the electrolyte. Examples of electroactive materials that may be utilized in lithium batteries include, for example, lithium cobalt oxide, lithium manganese oxide, lithium iron phosphate, lithium nickel manganese cobalt oxide (NMC), and sulfur as electroactive materials in the cathode layers and lithium titanate, lithium metal, silicon, lithium-intercalated graphite, and lithium-intercalated carbon as electroactive materials in the anode layers.

These battery stacks and batteries described herein also include a current collector, which can be one or more current collection layers that are adjacent to an electrode layer. One function of the current collector is to provide a electrically conducting path for the flow of current into and from the electrode and an efficient electrical connection to the external circuit to the cell. A current collector may include, for example, a single conductive metal layer or coating, such as the sintered metal particle layer discussed herein. As discussed further below, an exemplary conductive metal layer that could function as a current collector is a layer of sintered metal particles comprising nickel, which can be used for both the anode or cathode layer. In embodiments of the invention, the conductive metal layer may comprise aluminum, such as aluminum foil, which may be used as the current collector and substrate for the positive electrode or cathode layer. In other embodiments the conductive metal layer may comprise copper, such as a copper foil, which may be used as the current collector and substrate for the negative electrode or anode layer.

The batteries described herein also include an electrolyte, such as those that are useful in lithium batteries. Suitable electrolytes include, for example, liquid electrolytes, gel polymer electrolytes, and solid polymer electrolytes. Suitable liquid electrolytes include, for example, $LiPF_6$ solutions in a mixture of organic solvents, such as a mixture of ethylene carbonate, propylene carbonate, and ethyl methyl carbonate.

In one embodiment the present invention includes a lithium battery comprising: an anode, a cathode, wherein the cathode comprises one or more transition metals, an electrolyte, and a porous separator interposed between the cathode and anode, wherein the separator comprises an anionic compound. In one embodiment the anode comprises lithium metal. In one embodiment the cathode comprises one or more transition metals selected from the group consisting of manganese, nickel and cobalt. In one embodiment the porous separator comprises one or more inorganic oxides or nitrides. In one embodiment the separator comprises boehmite. In one embodiment the anionic compound comprises two or more anionic groups. In one embodiment the anionic groups are selected from the group consisting of sulfonate and carboxylate. In one embodiment the cation of the anionic groups comprises a lithium ion. In one embodiment the anionic compound comprises greater than about 0.1 weight percent of the weight of the porous separator. In one embodiment the anionic compound is an anthraquinone. In one embodiment the anionic compound is a photosensitizer. In one embodiment the photosensitizer is an oxygen scavenger. In one embodiment the separator comprises polymer formed by the absorption of photons by the photosensitizer. In one embodiment the anionic compound is an oxidizer of lithium metal. In one embodiment the porous separator has an average pore diameter of less than about 100 nm. In one embodiment the porous separator is a scavenger of HF in the electrolyte. In one embodiment the porous separator inhibits the migration of transition metal cations through the separator. In one embodiment the cathode and the anode comprise electrode layers and one or more electrode layers are coated on the separator.

In one embodiment the present invention includes a separator for an electric current producing cell comprising: one or more inorganic oxides or nitrides, a binder, and an anionic compound. In one embodiment the anionic compound is selected from the group consisting of sulfonate and carboxylate. In one embodiment the anionic compound is an oxidizer of lithium metal dendrites. In one embodiment, the anionic compound is a photosensitizer.

In one embodiment the present invention includes a battery stack comprising: a porous separator, an electrode layer adjacent the porous separator, a current collector layer coated on the electrode layer, and a reinforcement area along one or more edges of the battery stack, wherein the reinforcement area comprises a polymer. In one embodiment the reinforcement area comprises a polymer impregnated in the pores of the porous separator. In one embodiment the reinforcement area comprises a layer of polymer overlying the porous separator. In one embodiment the porous separator further comprises a photosensitizer.

BRIEF DESCRIPTION OF THE DRAWINGS

The features and advantages of the present disclosure will be more fully understood with reference to the following, detailed description when taken in conjunction with the accompanying figures, wherein.

DETAILED DESCRIPTION

This invention pertains to battery stacks for use in batteries, such as lithium ion batteries and lithium metal batteries, as well as methods of making such batteries and related nanoporous separators. Among other benefits, the coated battery stacks and batteries of the present invention have a lower cost and provide improved safety.

The present invention includes, but is not limited to, the following designs for lithium batteries and stacks and methods of making such batteries. In the following examples, the coated stack may be either an anode stack or a cathode stack, depending on the electrode material selected.

One aspect of the present invention will be described with reference to a process for manufacturing a lithium battery. One suitable process is described in co-pending U.S. patent application Ser. No. 15/130,660, which is incorporated by reference in its entirety. The process may utilize a reusable substrate 10, onto which the various layers of the battery stack are coated. Once the battery stack is assembled, the battery layers (e.g., electrode, separator, current collector) are delaminated from the substrate 10 and the substrate can be reused to create another battery stack according to the same process. The use of a reusable substrate provides cost saving benefits and reduces waste. However, it is noted that this same process can be carried out using a disposable or non-reusable substrate.

The first step of the process includes coating a substrate 10 with a release coating 30. The substrate 10 and release coating 30 will be referred to herein, collectively, as the release layer. The substrate 10 may comprise any strong, heat resistant film, such as polyethylene terephthalate ("PET"), polyethylene-naphthalate ("PEN") or other polyester film. In a preferred embodiment, the substrate 10 may comprise a 75-125 μm thick PET film. PET provides a robust substrate for the disclosed process since it has a high tensile strength, and is chemically, thermally and dimensionally stable. Advantageously, as a result of the thickness, tear resistance and resistance to distortion of PET film, wide rolls, such as those having a width of 1.5-2.0 meters, can be processed quickly and reliably. For example, coated battery stacks can be processed at speeds of 125 m/min.

A heat stable and compression resistant porous separator layer 20 is then coated onto the release layer. The coated separator layer 20 can be made thinner than known free-standing separators. The coated separator layer 20 is also highly compatible with a roll-to-roll coating process, such as that described above.

Figure 1:
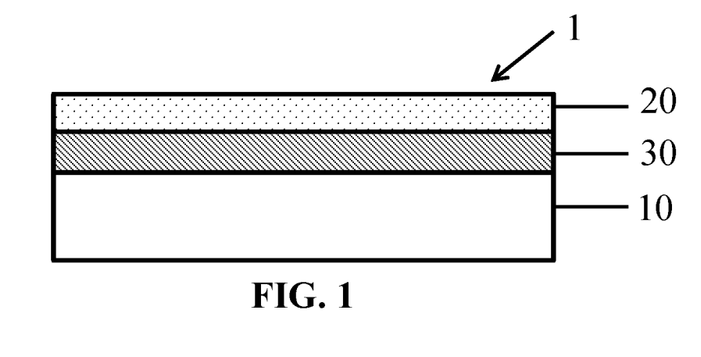
FIG. 1 is a cross-sectional view of a partially assembled battery stack 1 showing a porous separator 20 coated over a substrate 10 and release coating 30.

In one embodiment, the separator layer is coated at a thickness of 5-8 μm across the full width of the release film. FIG. 1 shows an example of a cross-sectional view of the assembly 1 after the coating of the separator 20 onto the substrate 10 and release coating 30.

Examples of a suitable separator layer 20 for the present invention include, but are not limited to, the porous separator coatings described in U.S. Pat. Nos. 6,153,337 and 6,306,545 to Carlson et al., U.S. Pat. Nos. 6,488,721 and 6,497,780 to Carlson and U.S. Pat. No. 6,277,514 to Ying et al. Certain of these references disclose boehmite ceramic separator layers, which are suitable for use with the instant invention. See, e.g., U.S. Pat. No. 6,153,337, Col. 4, ll. 16-33, Col. 8, ll. 8-33, Col. 9, l. 62-Col. 10, l. 22 and Col. 18, l. 59-Col. 19, l. 13; U.S. Pat. No. 6,306,545, Col. 4, l. 31-Col. 5, l. 17 and Col. 10, ll. 30-55; and U.S. Pat. No. 6,488,721, Col. 37, ll. 44-63. U.S. Pat. No. 6,497,780 discloses boehmite ceramic separator layers, as well as other ceramic separator layers including those with a xerogel or sol gel structure, all of which are suitable for use with the instant invention. See, e.g., U.S. Pat. No. 6,497,780, Col. 8, l. 66-Col. 10, l. 23 and Col. 11, l. 33-Col. 12, l. 3. U.S. Pat. No. 6,277,514 teaches coating one or more protective coating layers onto a boehmite ceramic separator layer. These protective coating layers include inorganic layers designed to protect the metal anode surface, such as in a lithium metal anode. See, e.g., U.S. Pat. No. 6,277,514, Col. 5, l. 56-Col. 6, l. 42, Col. 9, ll. 14-30, Col. 10, ll. 3-43, Col. 15, ll. 27-56 and Col. 16, ll. 32-42.

Preferred separator layers suitable for use with the present invention are also described in U.S. Pat. App. Pub. No. 2013/0171500 by Xu et al. One such separator comprises a microporous layer comprising (a) at least 50% by weight of an aluminum boehmite and (b) an organic polymer, wherein the aluminum boehmite is surface modified by treatment with an organic acid to form a modified aluminum boehmite. See, e.g., Pars. 28, and 34-36. The organic acid may be a sulfonic acid, preferably an aryl sulfonic acid or toluene-sulfonic acid, or a carboxylic acid. The modified boehmite may have an $Al_2O_3$ content in the range of 50 to 85% by weight, or more preferably in the range of 65 to 80% by weight. The separator may comprise 60 to 90% by weight of the modified aluminum oxide, or more preferably 70 to 85% by weight of the modified boehmite. In embodiments of the invention, the microporous layer may be a xerogel layer. The organic polymer may comprise a polyvinylidene fluoride polymer. The separator layer 20 may further comprise a copolymer of a first fluorinated organic monomer and a second organic monomer.

Other preferred separator layers suitable for use in embodiments of the present invention are described in International App. No. WO2014/179355 by Avison et al. The separator layers described in that application include boehmite, a variety of other pigments, and blends thereof. See, e.g., WO2014/179355, Pars. 4-6, 8, 21, 26, and 27. In a preferred embodiment, the separator layer 20 is a nanoporous inorganic ceramic separator. More specifically, the nanoporous battery separator includes ceramic particles and a polymeric binder, wherein the porous separator has a porosity between 35-50% and an average pore size between 10-90 nm, or more preferably between 10-50 nm. The ceramic particles may be inorganic oxide particles or inorganic nitride particles. Preferably, the porous ceramic separator exhibits less than 1% shrinkage when exposed to a temperature of 200° C. for at least one hour. The ceramic particles may include at least one of $Al_2O_3$ or alumina, AlO(OH) or boehmite, AlN, BN, SiN, ZnO, $ZrO_2$, $SiO_2$, or combinations thereof. In a preferred embodiment, the ceramic particles include between 65-100% boehmite and a remainder, if any, of BN. Alternatively, the ceramic particles may include between 65-100% boehmite and a remainder, if any, of AlN. The polymeric binder may include a polymer, such as polyvinylidene difluoride (PVdF) and copolymers thereof, polyvinyl ethers, urethanes, acrylics, cellulosics, styrene-butadiene copolymers, natural rubbers, chitosan, nitrile rubbers, silicone elastomers, PEO or PEO copolymers, polyphosphazenes, and combinations thereof.

In one embodiment, the separator layer comprises an inorganic oxide that is surface modified by treatment with an organic sulfonic acid to form a modified inorganic oxide and also comprises an inorganic oxide that is not surface modified by treatment with an organic sulfonic acid. In one embodiment, the organic sulfonic acid is an aryl sulfonic acid, and more preferably a toluenesulfonic acid. In one embodiment, the inorganic oxide comprises a boehmite. In one embodiment, the boehmite is surface modified by treatment with an organic sulfonic acid to form a modified hydrated aluminum oxide. In one embodiment, the blend of the treated and the non-treated inorganic oxides is in a ratio of about 1:3 to 3:1 by weight, preferably in the range of about 2:3 to 3:2. In one embodiment, a crosslinking material, such as an isocyanate, is added to provide additional mechanical strength to the separators. Multifunctional isocyanates are preferred. The weight percent of the isocyanate is typically in the range of 1 to 10% of the weight of the polymer in the separator with about 6% by weight being a preferred level.

In one embodiment, a water extraction is done on the separator to remove any water-soluble materials from the separator, such as an organic sulfonic acid. This water extraction is, preferably, done before the separator is used in the construction of a battery stack. One method for performing such water extraction is utilizing a water bath immersion at about 80° C., which is highly compatible with the high speed manufacturing process discussed above. Furthermore, at the time of immersion, an anionic treatment (discussed further below) can be applied to the separator.

Among other benefits, water extraction increases the percent porosity of the separator, which provides better ionic conductivity of the electrolyte and greater mechanical strength to the separator, for a given percent porosity. For example, some of the organic sulfonic acid that is not covalently bonded, or otherwise strongly bound, to the inorganic oxide can be removed by water extraction. For example, a separator comprising an inorganic oxide treated with an organic sulfonic acid may exhibit a weight loss of about 1% upon water extraction. This weight reduction is sufficient to increase the percent porosity of the separator by 2 to 3% and increase the mechanical strength of the separator by 10% or more.

In one embodiment of this invention, the separator is dried at a temperature of at least 130° C. up to a temperature of as high as 240° C., preferably under vacuum conditions. In one embodiment, this drying at high temperatures is done for more than 1 hour, and preferably more than 3 hours. In one embodiment, a vacuum drying is done in a dry cell comprising electrodes and separator prior to filling the cell with electrolyte. This high temperature drying of the separators, especially under vacuum conditions, is useful for increasing the mechanical strength of the separators, typically by at least 10%, and for reducing any residual water content that may degrade the battery, such as in forming any HF and other decomposition products of the electrolyte salt by reaction with water. This reduction in water content in turn causes less dissolution of the nickel, manganese, and other transition metals in the cathodes to prevent their undesirable diffusion through the separator into the anode. This reduction in water content by high temperature drying, enabled by the very high heat stability of the ceramic separators, also contributes to a more efficient formation cycling of the battery to form the anode and cathode stabilization layers, commonly referred to as the solid electrolyte interface (SEI) layers (discussed further below), which provides longer cycling lifetimes and better rate capability.

As the lithium-ion battery industry moves toward the use of transition metal cathodes, such as NMC and others with higher nickel and manganese content, it is desirable to inhibit the diffusion and migration of dissolved metal ions (e.g., nickel and manganese ions) into and through the separator and to the anode. In one example, a lithium-ion battery was constructed with a porous separator comprising boehmite pigments with an average primary particle size of about 35 nm and cathodes comprising nickel-manganese-cobalt oxide (NMC). The small pore size provides efficient diffusion of the small lithium ions (with their associated complex of organic carbonates or other electrolyte solvent molecules) with little to no loss in ionic conductivity. It was found that the diffusion of manganese and nickel ions from cathodes comprising nickel-manganese-cobalt oxide (NMC) cathodes was inhibited from passing into the separator and into the anode areas where undesired degradation of the battery chemistry could occur. The inhibition of the diffusion of the heavy and larger metal ions, such as manganese and nickel, could be seen, for example, by the absence of any coloration from these metal ions in the white separators of the present invention. By comparison, no such inhibition was found with polyolefin and ceramic-coated polyolefin separators where the ceramic coating had pores up to 500 nm or more in diameter.

If an increased diffusion inhibition is desired, the porous separator may be treated with anionic, dianionic and other materials. Such treatments further reduce the pore size and provide charged species on the walls of the pores, which may enhance the cationic nature of the aluminum or other inorganic element of the inorganic oxide or inorganic nitride of the separator. Such treated separators function to scavenge and remove HF and other degradation products, such as $POF_3$, of the lithium salt of the electrolyte, and increase the cycle lifetime, as compared to known separators. Typically, the anionic compound is applied to the separator from a solution comprising at least 2%, and preferably 10% or more, of the anionic compound. The anionic compound may comprise 0.1 weight percent or greater of the weight of the separator.

In one embodiment, the treatment of the separator may comprise a compound with only one anionic group, which complexes (or attaches) to the aluminum or other cationic group of the separator and consequently has no anionic group remaining free for complexing with any transition metal cations diffusing from the cathode. For example, the compound with a single anionic group could be an anthraquinone compound, such as anthraquinone-2-sulfonate (AQS). The AQS could be a sodium salt or, preferably, it is a lithium salt. Although the separator (after treatment with AQS or another monoanionic compound) does not have a free remaining anionic group to complex with transition metal cations, it may prevent the diffusion of transition metal cations into and through the separator by the reduction of the pore size, particularly when the average pore size is less than about 50 nm in diameter and/or when the anionic compound is relatively large and in a planar shape, as is the case with AQS and anthraquinone-2,6-disulfonate (AQdiS). Separators treated with monoanionic compounds, such as AQS, will still function as a photosensitizer, oxidizer of lithium metal, and oxygen scavenger after their reduction, as described below for separators treated with AQdiS and other dianionic compounds.

Alternatively, the treatment of the separator utilizes a compound with two or more anionic groups. In such compounds, one of the anionic groups complexes to the aluminum or other inorganic cationic group of the separator, while the other anionic groups remain free and available for complexing with any nickel, manganese, or other transition metal ions from the cathode that may diffuse into the separator.

The anionic groups of the compounds with two or more anionic groups comprise anions selected from the group consisting of sulfonates and carbonates, and combinations thereof. The compound with two or more dianionic groups may include an anthraquinone compound, such as, for example, AQdiS sodium salt or lithium salt. An aqueous solution of AQdiS, particularly when heated to above 80° C. to provide a higher concentration of AQdiS, readily complexes to a ceramic separator, such as separators comprising boehmite. This complex is not dissolved by the electrolytes used in lithium batteries and, thus, remains in the pores of the separator to act as an inhibitor to diffusion. When the pores of the ceramic separator are nanoporous, such as with an average pore size of less than about 100 nm, some of the sulfonate groups of dianionic compounds, such as ASdiS, are sterically unable to complex to the cationic portion of the separator. This is beneficial because these groups of compounds remain free to complex with nickel, manganese, and other transition metal ions and reduce their undesirable diffusion into the anode.

Some of the dianionic compounds suitable for use with the present invention, such as anthraquinone compounds with two or more dianionic groups, have useful features in addition to reducing the diffusion of transition metal cations into the anode. These additional useful features include, for example, functioning as a photoinitiator, and for reacting with and oxidizing any metallic lithium that contacts the separator. AQdiS has a moderately strong absorption peak around 320 nm with absorption out to about 400 nm and is an effective photosensitizer of UV-curing to photopolymerize monomers and oligomers. This attribute is useful in connection with the edge reinforcement procedure described herein, as well as for improving the overall mechanical strength of the separator. Using a hot water solution of AQdiS to treat the ceramic separator, such as one comprising boehmite, may provide a strongly absorbing AQdiS photosensitizer with an optical density that is 0.3 or higher than that of the separator before treatment.

It is generally understood that the safety of lithium batteries can be improved by reducing or removing oxygen present in the electrolyte, since a lower oxygen content reduces flammability. In this regard, the photosensitization by AQdiS involves the photo-induced reduction of the AQdiS, and typically the abstraction of a hydrogen atom from the photo-sensitized compound. The transient, photo-reduced, AQdiS re-oxidizes in the presence of oxygen back to the original AQdiS. This type of reversible reaction of the photosensitizer is useful in removing oxygen from a system, such as in a battery electrolyte. Certain anthraquinone compounds, such as AQdiS, are reduced by contact with lithium metal and can function to oxidize any lithium metal dendrites that come into contact with them. Since the reduced anthraquinone compounds, in the presence of any oxygen, can be oxidized back to the original anthraquinone compound, a single anthraquinone compound can reduce numerous lithium metal atoms over the lifetime of the battery, provided that there is oxygen available to oxidize the reduced anthraquinone compound.

The separators may also be calendered to further reduce their pore sizes to improve their inhibition of manganese and other large, heavy metal ion diffusion, as well as to increase their mechanical strength. For example, a calendering that reduces the thickness of the separator by about 8% was found to increase the tensile strength of the boehmite separator by about 15%.

In one embodiment, the separator is coated with a lithium metal layer to "prelithiate" the battery, such as, for example, a battery comprising silicon in the anode. In this regard, when a lithium-ion cell is charged for the first time, lithium ions diffuse from the cathode and are introduced into the anode where they are reduced to lithium metal. As a result, a decomposition product of lithium metal and the electrolyte, known as the solid electrolyte interface (SEI), readily forms on the surfaces of the anode, wherein the thin SEI layer comprises lithium and electrolyte reaction components. As the SEI layer is formed, a portion of the lithium introduced into the cells via the cathode is irreversibly bound and thus removed from cyclic operation, i.e. from the capacity available to the user. This process may consume about 10% to 20% of the capacity of a lithium-ion cell and as much as 50% depending on the amount of silicon in the anode. It is therefore beneficial to "prelithiate" the anode (i.e., make more lithium available as the anode active material) in order to minimize the lithium consumption of the first charge-discharge cycle and thus the irreversible capacity loss.

Thermal runaway and other heat-related safety problems with lithium-ion and other lithium based batteries are well-known. Therefore, a thin safety shutdown layer (not shown) may optionally be applied to the separator 20 side of the coated stack. The safety shutdown layer rapidly shuts down the operation of the battery when the temperature of the cell reaches a temperature in the range of 100° C. to 150° C., preferably in the range of 105° C. to 110° C. In a preferred embodiment, this safety shutdown layer has a thickness from 0.5 to 5 microns. The safety shutdown layer coating may comprise water or alcohol solvents so that it can be conveniently applied during the delamination, slitting, or other converting steps without requiring the use of a coating machine and involving undue mechanical stresses on the coated stacks without having a release substrate attached. The safety shutdown layer may comprise particles selected from the group consisting of polymer particles (e.g., styrene acrylic polymer particles, polyethylene particles, and fluorinated polymers and copolymers) and wax particles, alone or in blends with each other.

Suitable safety shutdown layers are described in U.S. Pat. No. 6,194,098 to Ying et al. Specifically, Ying teaches a protective coating for battery separators (e.g., boehmite ceramic separators) comprising polyethylene beads. See, e.g., Ying, Col. 10, l. 66-Col. 14, l. 19. When a threshold temperature is reached, the polyethylene beads melt and shut down the cell. Other suitable safety shutdown layers, particularly those suitable for use with both ceramic separators and other separators (e.g., plastic separators), are described in U.S. Pat. No. 9,070,954 to Carlson et al. Carlson describes a microporous polymer shutdown coating, see, e.g., Col. 2, l. 15-Col. 3, l. 28, that can be incorporated into the disclosed coated stack and process.

Figure 2:
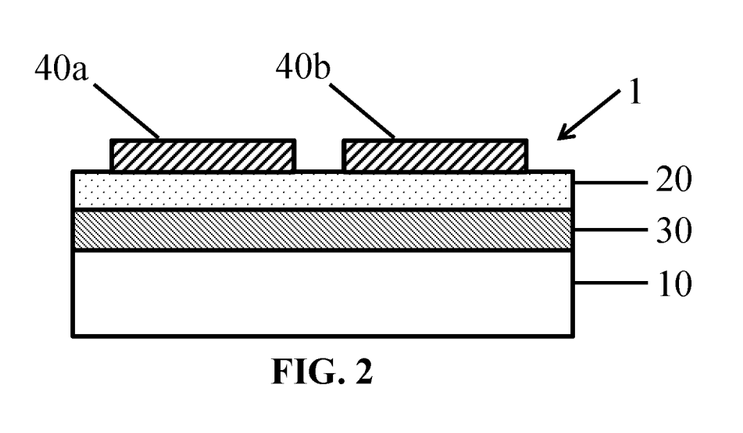
FIG. 2 is a cross-sectional view of the battery stack of FIG. 1, with the addition of electrode lanes 40a, 40b coated over the porous separator layer 20.
Figure 3:
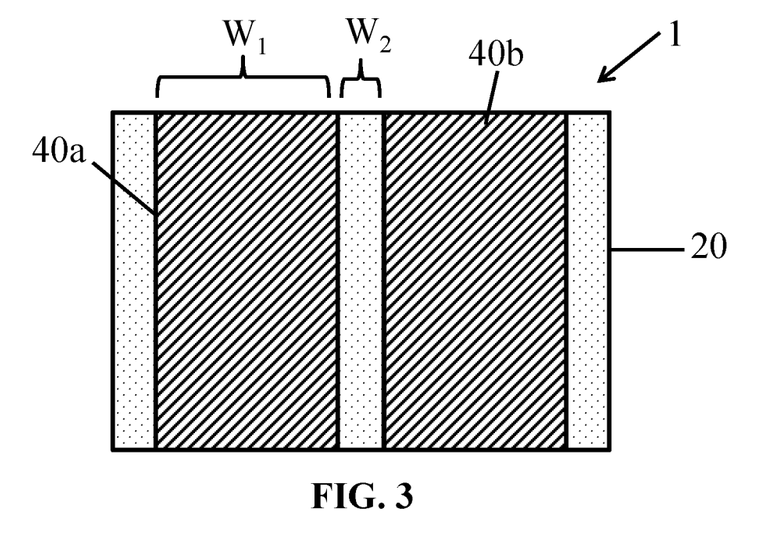
FIG. 3 is a plan view of the battery stack shown in FIG. 2.

As shown in FIGS. 2 and 3, one or more electrodes 40a, 40b are then coated onto the separator layer 20. Suitable materials and methods for coating electrodes directly on nanoporous separators are described in, for example, U.S. Pat. No. 8,962,182 (see, e.g., Col. 2, l. 24-Col. 3, l. 39, Col. 4, ll. 49-56, Col. 5, ll. 9-65 and Col. 6, l. 2-Col. 8, l. 7), U.S. Pat. No. 9,065,120 (see, e.g., Col. 3, ll. 12-65, Col. 4, ll. 18-61, Col. 8, l. 2-Col. 9, l. 31, Col. 9, ll. 42-67 and Col. 14, ll. 6-23), U.S. Pat. No. 9,118,047 (see, e.g., Col. 2, l. 24-Col. 3, l. 33, Col. 4, ll. 36-51 and Col. 5, l. 3-Col. 6, l. 21) and U.S. Pat. No. 9,209,446 (see, e.g., Col. 2, l. 20-42, Col. 3, ll. 1-56, Col. 5, ll. 16-31 and Col. 7, l. 1-Col. 8, l. 65). These patents, as well as the applications referenced therein, are incorporated by reference in their entireties.

Depending on the requirements of the end use, the electrode coating layer 40a, 40b may be coated on the entire surface of the separator layer 20, in lanes or strips on the separator layer 20, or in patches or rectangle shapes on the separator layer 20. Cathode coating layers may be coated from a pigment dispersion comprising water or an organic solvent, such as N-methyl pyrrolidone (NMP), and contain the electroactive or cathode active material in a pigment form, a conductive carbon pigment, and art organic polymer. Anode coating layers may be coated from a pigment dispersion comprising an organic solvent or later, and contain the electroactive or anode active material in a pigment form, a conductive carbon pigment, and an organic polymer. These electrode pigments are particles with diameters typically in the range of 0.5 to 5 microns. Preferably, there is no penetration of the conductive and other pigments of the electrodes 40a, 40b into or through the separator layer 20.

In the embodiment shown in FIGS. 2 and 3 the electrodes are coated in lanes 40a, 40b. Electrode lanes 40a, 40b may be deposited using a slot die coater, or other methods known in the art. FIG. 2 shows an example of a cross-section view of a portion of the assembly 1 following the coating of the electrodes 40a, 40b. FIG. 3 shows a plan view of the same assembly 1. Two lanes, 40a and 40b, are shown in FIGS. 2 and 3 for ease of illustration. However, it should be understood that additional or fewer lanes, for example, 1-15 lanes (or even more), could be coated across the full width of the assembly in order to maximize yield or volume output of the number of individual battery stacks that can be slit from the assembly.

In this regard, the electrode layer is coated in lanes 40a, 40b in a desired width for the final coated stack design and battery end use. In one embodiment, the lanes 40a, 40b preferably have a width, $W_1$, of 12 to 25 cm and are spaced apart from one another by a distance, $W_2$, of 2 to 4 cm.

Figure 4:
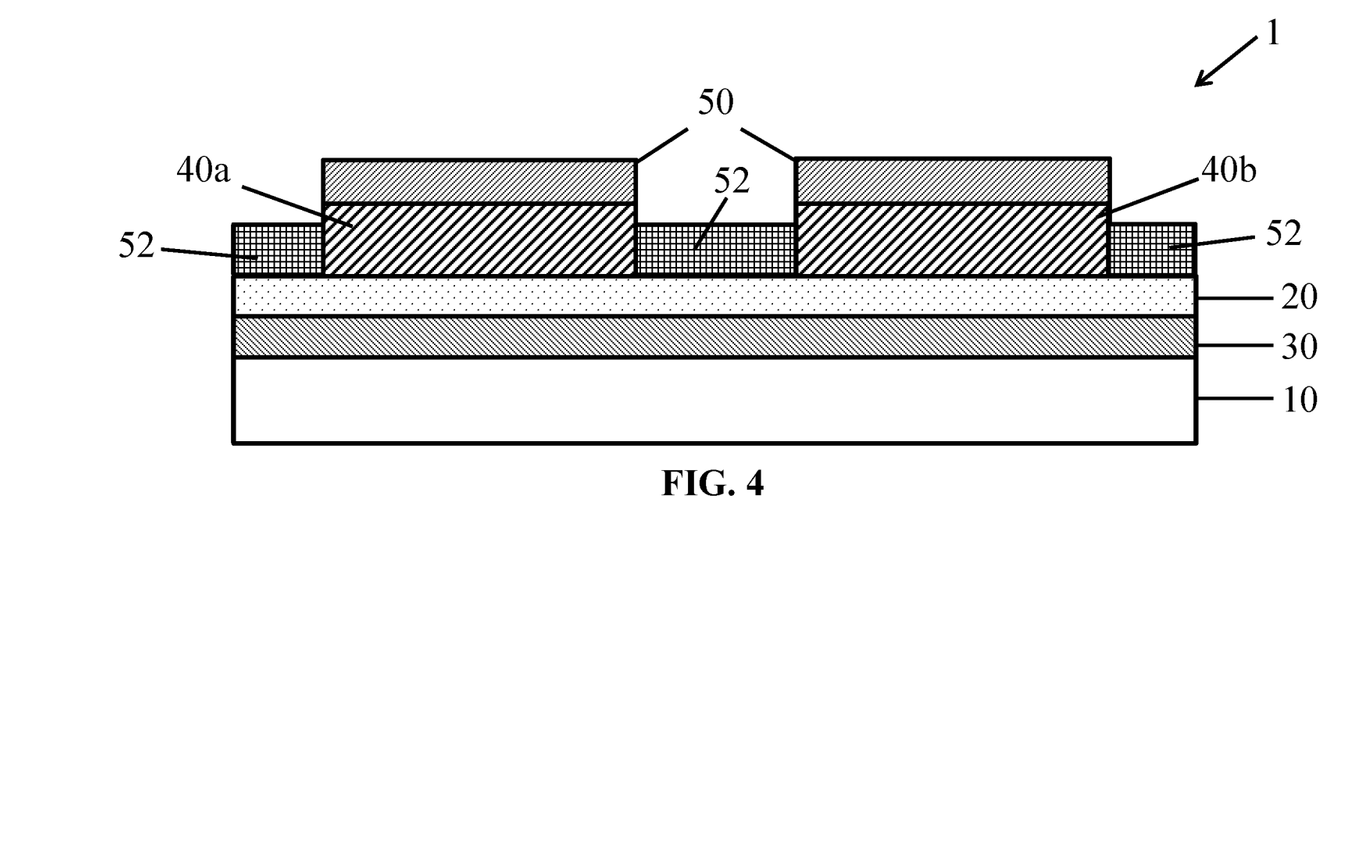
FIG. 4 is a cross-sectional view of the battery stack of FIGS. 2 and 3, with the addition of a current collector layer 50 coated over the electrode lanes and reinforcement portions 52 coated over separator layer 20.

In one embodiment, shown in FIG. 4, a current collection layer 50 is coated onto the electrode side of the assembly, which, at this point in the process, comprises the substrate 10, release coating 30, separator 20 and electrodes 40a, 40b. Methods of coating current collection layers, and materials for forming such layers, are disclosed in co-pending U.S. patent application Ser. No. 15/130,660.

For example, the current collector layer 50 can comprise nickel metal. A nickel current collection layer is preferred because it can be used as a current collection layer in either an anode stack or a cathode stack. In addition, nickel is generally less likely to oxidize and is more electrochemically stable than copper, aluminum, or other metals used in current collector layers. However, as discussed below, copper, aluminum and other materials can be used as well.

In order to improve the mechanical integrity of the coated stack, reinforcement areas 52 (shown in FIG. 4) may be added to the coated stack. Reinforcement areas 52, preferably, cover the entire surface of the separator 20 between the electrode lanes 40a, 40b. Later in the process, the reinforcement areas 52 will become the edge or near edge areas of the coated stacks when the stacks are slit to their final width. The coating that comprises reinforcement areas 52 provides much greater mechanical strength to the coated stacks, especially for tear resistance and tensile strength. This is important after the coated stacks have been delaminated from the strong and flexible release substrate and have become free-standing. When they are free-standing, the coated stacks, especially the electrode layers, could (in the absence of a reinforcement area) become brittle and may even crack or tear during processing. The presence of a mechanically strong and flexible edge reinforcement area 52 minimizes (and can even eliminate) the problem of tearing during the processes of delaminating, slitting, punching, tabbing, and stacking into the final cell. This approach of edge reinforcement is also useful for free-standing separators, such as ceramic separators.

In one embodiment, the reinforcement areas 52 are reinforced with polymer. The polymer may be impregnated into the pores of the separator 20 and/or coated over the separator 20. Alternatively, this reinforcement could be provided by heating an overlying layer, such as a porous polymer safety shutdown layer (discussed above) to melt polymer in the edge areas of the separator into the pores or into a thin layer overlying the separator. This approach includes a "sandwich" construction where the porous polymer layer, such as a shutdown layer, is between two layers of the inorganic separator. Upon heating the edge areas, this trilayer construction is laminated and strengthened in the edge areas. Alternatively, the reinforcement of the edges of the separator could be provided by utilizing the photosensitizing properties of the photosensitizer that is complexed to the separator (discussed above). For example, during the converting process, a liquid comprising photo-curable compounds, such as 1,6-hexanedioldiacrylate (HDDA), could be coated in the edge reinforcement areas and then cured by UV absorption by the photosensitizer in the separator. Additional photosensitizer can be added to the liquid comprising the radiation curable compounds for additional curing efficiency and in the cases where the edge reinforcement is above the separator layer as well as in the pores of the separator.

After coating to provide the current collector layer 50, a second electrode layer (not shown) can be coated onto the current collector layer 50. In a preferred embodiment, this second electrode layer is coated in a lane of substantially the same width as the lane of the first electrode layer 40a, 40b and directly over the position of the first electrode layer. This provides anode and cathode stacks with an electrode coating on both sides of the current collector, which are the most typical cell assembly configuration for the electrodes, i.e., double side electrode coatings on the current collector layer. After the second electrode coating, the coated stack on the release substrate is preferably calendered to densify the second electrode.

Figure 5:
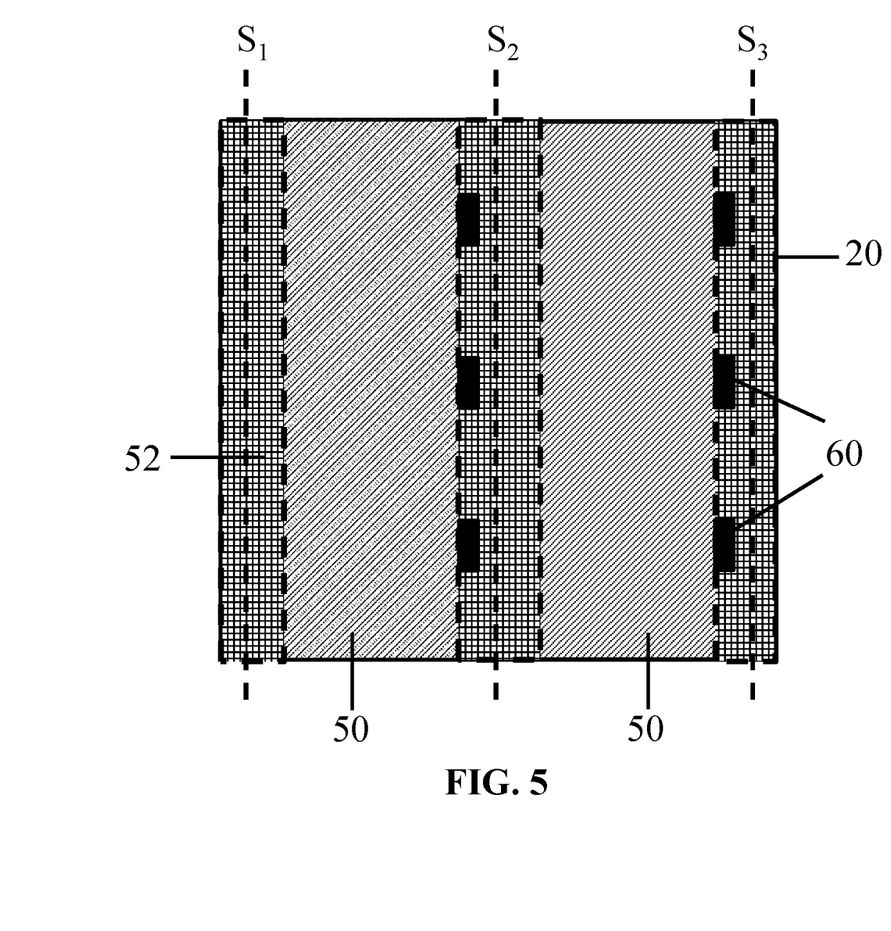
FIG. 5 is a plan view of the battery stack of FIG. 4, with the addition of conductive tabbing patches 60 on reinforcement portions 52, and further indicating the location of slit lines $S_1$, $S_2$ and $S_3$.

Next, the assembly is prepared for tabbing, i.e., electrical interconnection. In the embodiment shown in FIG. 5, patches 60 of a conductive material have been coated in the desired tabbing location to obtain high electrical conductivity in these areas. Patches 60 are in electrical contact with current collector 50. It should be understood that the placement and number of conductive patches 60 will vary based upon the particular battery design. As will be discussed further below, the embodiment shown in FIG. 5 represents a patch 60 configuration for a cylindrical or "jellyroll" layout.

In one embodiment, the next step is to delaminate the coated battery stacks from the release substrate 10 so that the coated stacks may be converted into finished cells. As discussed above, to save cost, the substrate 10 may be re-used for making another coated stack. Preferably, the release substrate 10 is cleaned and inspected prior to each re-use.

The next step is to slit the coated stack assembly 1 to the desired width. In the embodiment shown in FIG. 5, slitting is done through the areas of the separator layer 20, namely $S_1$, $S_2$ and $S_3$, which do not contain electrode or current collector layers. Since the separator layer 20 and reinforcement areas 52 are the only layers slit, there is no possibility of generating conductive fragments or debris, e.g., from the electrode or current collector layers. By comparison, in prior art methods, slitting is typically performed through a metallic or conductive metal foil layer. However, slitting these metal layers generates conductive debris (e.g., metal shards or shavings) that can cause the cell to fail during manufacture or in the field due to a short circuit, which can result in a fire or the explosion of the battery. Thus, the potential for such dangerous conditions are avoided with the present invention.

Figure 6:
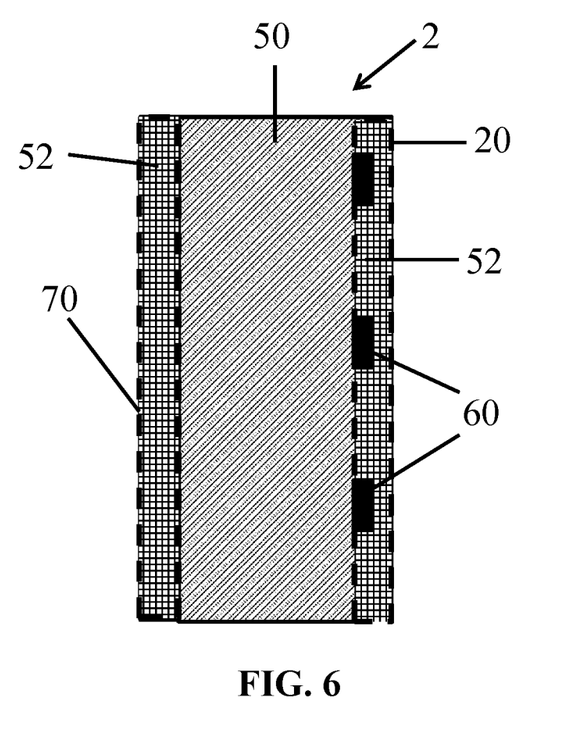
FIG. 6 is a plan view of the battery stack assembly shown in FIG. 5 after a slitting step has been performed.

The embodiment shown in FIG. 6 provides a coated stack 70 for use in a jellyroll configuration. In this regard, the coated stack 70 would be wound with a coated stack of the opposite polarity into a jellyroll and packaged in a cylindrical case. The discrete coated stacks 70 can be tabbed and welded using conventional methods.

Now that the preferred embodiments of the present invention have been shown and described in detail, various modifications and improvements thereon will become readily apparent to those skilled in the art. The present embodiments are therefor to be considered in all respects as illustrative and not restrictive, the scope of the invention being indicated by the appended claims, and all changes that come within the meaning and range of equivalency of the claims are therefore intended to be embraced therein.

What is claimed is:

1. A method of manufacturing a battery comprising the steps of:
   (a) providing an anode;
   (b) providing a cathode that comprises one or more transition metal oxides;
   (c) providing a porous separator that comprises boehmite and an anionic compound that comprises an anthraquinone;
   (d) providing a lithium metal layer on a surface of the separator;
   (e) interposing the separator and the lithium metal layer between the anode and the cathode;
   (f) providing an electrolyte; and
   (g) assembling so as to provide the battery.

2. The method of claim 1, further comprising the step of prelithiating the anode with lithium from the lithium metal layer.

3. The method of claim 1, wherein the lithium metal layer is deposited by coating.

4. The method of claim 1, wherein the lithium metal layer is deposited by vacuum deposition.

5. The method of claim 1, wherein the battery is a lithium ion battery.

6. The method of claim 1, wherein the separator is a free-standing separator.

7. The method of claim 1, wherein the one or more transition metals oxides are selected from a group consisting of manganese, nickel, and cobalt.

8. The method of claim 2, wherein prelithiation of the anode occurs when the battery is charged and discharged in a first charge-discharge cycle.

9. A method of manufacturing a battery comprising the steps of:
   (a) providing an anode;
   (b) providing a cathode that comprises one or more transition metal oxides;
   (c) providing a porous separator that comprises an inorganic oxide and an anionic compound that comprises an anthraquinone;
   (d) providing a lithium metal layer on a surface of the separator;
   (e) interposing the separator and the lithium metal layer between the anode and the cathode;
   (f) providing an electrolyte; and
   (g) assembling so as to provide the battery.

10. The method of claim 9, further comprising the step of prelithiating the battery with lithium from the lithium metal layer.

11. The method of claim 9, wherein the lithium metal layer is deposited by coating.

12. The method of claim 9, wherein the lithium metal layer is deposited by vacuum deposition.

13. The method of claim 9, wherein the battery is a lithium ion battery.

14. The method of claim 9, wherein the separator is a free-standing separator.

15. The method of claim 9, wherein the one or more transition metals oxides are selected from a group consisting of manganese, nickel, and cobalt.

16. The method of claim 10, wherein prelithiation of the anode occurs when the battery is charged and discharged in a first charge-discharge cycle.

17. The method of claim 1, wherein the separator has an average pore size of less than 50 nm.

18. The method of claim 1, wherein the separator further comprises a second anionic group.

19. The method of claim 1, wherein the anode comprises silicon.

20. The method of claim 9, wherein the separator has an average pore size of less than 50 nm.

* * * * *